United States Patent Office 2,889,319
Patented June 2, 1959

2,889,319

Δ⁸-7-CARBINOXY-STEROID COMPOUNDS AND PROCESSES OF PREPARING THE SAME

Arthur E. Erickson, Cranford, N.J., assignor to Merck & Co., Inc., Rahway, N.J., a corporation of New Jersey No Drawing. Application December 30, 1955
Serial No. 556,392

17 Claims. (Cl. 260—239.55)

This invention is concerned generally with steroid compounds having an ether group in the 7-position, a hydroxyl or acyloxy group in the 11-position, and an ethylenic unsaturation between the 8- and 9-positions, and with the processes for preparing these compounds. More particularly, it relates to a novel process for converting Δ⁷-9,11-epoxy-cyclopentanopolyhydrophenanthrene compounds to the corresponding Δ⁸-7-carbinoxy-11-(hydroxy or acyloxy)-cyclopentanopolyhydrophenanthrene compounds and to these new conversion products as well. The Δ⁸-7-carbinoxy-11-(hydroxy or acyloxy)-cyclopentanopolyhydrophenanthrene compounds prepared in accordance with my novel procedure are valuable as intermediates in the synthesis of other steroid compounds such as the adrenal hormone, cortisone.

This application is a continuation-in-part of application Serial No. 352,973, filed May 4, 1953, now abandoned.

The Δ⁸-7-carbinoxy-11-(hydroxy or acyloxy)-cyclopentanopolyhydrophenanthrene compounds, subject of the present invention, have at rings B and C the following chemical structure:

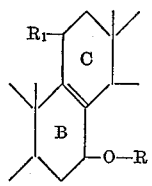

wherein R is a hydrocarbon radical, and R₁ is a hydroxy or acyloxy radical.

These Δ⁸-7-carbinoxy-11-(hydroxy or acyloxy)-cyclopentanopolyhydrophenanthrene compounds can be prepared as follows: a Δ⁷-9,11-epoxy-allo-cyclopentanopolyhydrophenanthrene compound (Compound 1 hereinbelow) is reacted with an alcohol in the presence of a relatively low concentration of an organic acid as catalyst, said acid having an ionization constant between $1.5 \times 10^{-5}$ and $1.5 \times 10^{-3}$, under substantially anhydrous conditions to form the corresponding Δ⁸-7-carbinoxy-11-hydroxy-allo - cyclopentanopolyhydrophenanthrene compound (Compound 2); the latter compound is converted by reaction with an acylating agent to the corresponding Δ⁸-7 carbinoxy - 11 - acyloxy - allo - cyclopentanopolyhydrophenanthrene compound (Compound 3).

The reactions indicated hereinabove may be chemically represented, insofar as rings B and C are concerned as follows:

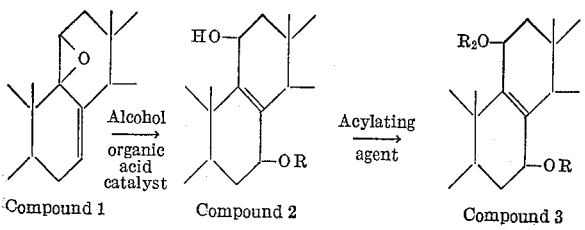

Compound 1       Compound 2       Compound 3 wherein R₂ is an acyl radical and R has the significance above defined.

The Δ⁷-9,11-epoxy-allo-cyclopentanopolyhydrophenanthrene compounds which I ordinarily employ as starting materials in carrying out the presently invented process are those having a sterol side chain attached to the carbon atom in the 17-position of the molecule such as ergosteryl D-acetate epoxide, Δ⁷,²²-9,11-epoxy-ergostadiene, Δ⁷,²²-3-acyloxy-9,11-epoxy-ergostadiene, Δ⁷,⁹,¹¹-epoxy-cholestene, Δ⁷-3-acyloxy-9,11-epoxy-cholestene, Δ⁷-3 - acetoxy - 9,11 - epoxy - cholestene, Δ⁷,²² - 3 - acyloxy - 9,11 - epoxy - stigmastadiene, Δ⁷,²² - 3 - acetoxy - 9,11 - epoxy-stigmastadiene, a bile acid side chain attached to the 17-carbon atom such as Δ⁷-3-acyloxy-9,11-epoxy-allocholenic acid, Δ⁷-3-acetoxy-9,11-epoxy-allocholenic acid, and alkyl esters thereof, a degraded bile acid side chain attached to the 17-carbon atom such as Δ⁷-3-acyloxy-9,11-epoxy-bisnor-allocholenic acid, Δ⁷-3-acetoxy-9,11-epoxy-bisnor-allocholenic acid, and alkyl esters thereof, a 17-acetyl substituent such as Δ⁷-3-acyloxy-9,11-epoxy-20-keto-allopregnene, Δ⁷-3-acetoxy-9,11-epoxy-20-keto-allopregnene, a sapogenin side chain such as Δ⁷-9,11-epoxy-dehydrotigogenin acylate, Δ⁷-3-acetoxy-9,11-epoxy-dehydrotigogenin, and the like.

These Δ⁷-9,11-epoxy-allo-cyclopentanopolyhydrophenanthrene compounds, utilized as starting materials in my process are conveniently prepared in accordance with procedures described in J.A.C.S. 73, 2396 (1951). I ordinarily start with readily available Δ⁷,⁹⁽¹¹⁾-cyclopentanopolyhydrophenanthrene compounds such as ergosterol-D and 3-acyloxy derivatives thereof; other Δ⁷,⁹⁽¹¹⁾-allo-cyclopentanopolyhydrophenanthrene compounds are also easily prepared, starting with readily available Δ⁵-cyclopentanopolyhydrophenanthrene compounds such as cholesterol, by treating said Δ⁵-cyclopentanopolyhydrophenanthrene compound with N-bromosuccinimide, reacting the resulting Δ⁵-7-bromo-cyclopentanopolyhydrophenanthrene compound with a tertiary amine to form the corresponding Δ⁵,⁷-cyclopentanopolyhydrophenanthrene compound, reacting this compound with hydrogen in the presence of Raney nickel catalyst thereby selectively reducing the unsaturated linkage attached to the carbon atom in the 5-position to form the corresponding Δ⁷-cyclopentanopolyhydrophenanthrene compound and bringing said Δ⁷-cyclopentanopolyhydrophenanthrene compound into intimate contact with a solution of mercuric acetate in acetic acid thereby producing the corresponding Δ⁷,⁹⁽¹¹⁾-cyclopentanopolyhydrophenanthrene compound. The Δ⁷,⁹⁽¹¹⁾-cyclopentanopolyhydrophenanthrene compound is then converted to the corresponding epoxide by reaction with perbanzoic acid thus forming the corresponding Δ⁷-9,11-epoxy - cyclopentanopolyhydrophenanthrene compound (Compound 1 hereinabove).

In carrying out my novel process, the Δ⁷-9,11-epoxyallo-cyclopentanopolyhydrophenanthrene compound, utilized as starting material therein, is reacted with an alcohol in the presence of a relatively low concentration of an organic acid as catalyst, said acid having an ionization constant between $1.5 \times 10^{-5}$ and $1.5 \times 10^{-3}$, under substantially anhydrous conditions to produce the corresponding Δ⁸-7 - carbinoxy-11-hydroxy-cyclopentanopolyhydrophenanthrene compound. Suitable alcohols for the reaction are the aliphatic cycloaliphatic, and arylaliphatic alcohols such as methyl alcohol, ethyl alcohol, cyclohexanol, benzyl alcohol, and the like. The amount of organic acid catalyst used is usually less than about 1% by volume of the reaction mixture and within the range of 0.1 and 0.3% by volume of the reaction mixture. While formic acid is the preferred catalyst, monochloracetic acid is almost as effective. Acids having an ionization constant greater than $1.5 \times 10^{-3}$ tend to promote the further rearrangement to unsaturated ketones. Acids having ionization constants lower than $1.5 \times 10^{-5}$ act much slower and greatly increase the reaction time, e.g., glacial acetic acid takes about twenty-four hours to catalyze the reaction in comparison with from 1 to 6 hours for formic and monochloracetic acids.

The reaction mixture should be maintained essentially anhydrous, since water may cause cleavage of the ether to a hydroxyl group. However, traces of moisture do not appear to harm the reaction and 88% formic acid is ordinarily employed rather than the anhydrous acid; when 88% formic acid is utilized as catalyst in an amount equal to about 1% by volume of the reaction mixture, the quantity of water in the resulting mixture is only about 0.1% of said mixture. It is also advantageous to carry out the reaction in an inert atmosphere to avoid oxidation of the hydroxy compounds formed, but this is not essential to the success of the reaction.

The process is preferably carried out at the reflux temperature of the alcohol which also functions as the solvent medium. With the lower alkanols which are preferred, the temperature is therefore in the range of about 60–80° C., but still higher temperatures may be employed since the monoether is quite stable in the absence of water.

Hydroxyl groups at the 3-position in the starting compounds are not attacked during the reaction, but are usually esterified prior to reaction in order to facilitate the further operations on the 7-carbinoxy-11-hydroxy compound. Acylation at the 3-position prior to reaction is much more desirable than any subsequent selective monoacylation of the 3,11-diol which would be formed.

The desired end product may be isolated and purified by conventional methods such as removal of the alcoholic solvent, chromatography, and recrystallization.

The reaction between the epoxide of the $\Delta^{7,9(11)}$-allocyclopentanopolyhydrophenanthrene compound and the alcohol results in the formation of the corresponding $\Delta^8$-7 - carbinoxy-11-hydroxy-cyclopentanopolyhydrophenanthrene compound such as $\Delta^{8,22}$-7-methoxy-11-hydroxy-ergostadiene, $\Delta^{8,22}$ - 7 ethoxy - 11 hydroxy - ergostadiene, $\Delta^{8,22}$ - 7 - cyclohexyloxy - 11 - hydroxy - ergostadiene, $\Delta^{8,22}$ - 7 - benzyloxy - 11 - hydroxy - ergostadiene, $\Delta^{8,22}$ - 3 - acyloxy - 7 methoxy - 11 - hydroxy - ergostadiene, $\Delta^{8,22}$ - 3 - acyloxy - 7 - ethoxy - 11 - hydroxy - ergostadiene, $\Delta^{8,22}$ - 3 - acyloxy - 7 - cyclohexyloxy - 11 - hy - droxy - ergostadidne, $\Delta^{8,22}$ - 3 - acyloxy - 7 - benzoyloxy - 11 - hydroxy - ergostadidne, $\Delta^{8,22}$ - 3 - acetoxy - 7 - methoxy - 11 - hydroxy - ergostadiene, $\Delta^{8,22}$ - 3 - acetoxy - 7 - ethoxy - 11 - hydroxy - ergostadidne, $\Delta^{8,22}$ - 3 - acetoxy - 7 - cyclohexyloxy - 11 - hydroxy - ergostadidne, $\Delta^{8,22}$ - 3 - acetoxy - 7 - benzyloxy - 11 - hydroxy - ergostadidine, $\Delta^8$ - 7 - methoxy - 11 - hydroxy - cholestene, $\Delta^8$ - 7 - ethoxy - 11 - hydroxy - cholestene, $\Delta^8$ - 7 - cyclohexyloxy - 11 - hydroxycholestene, $\Delta^8$ - 7 - benzyloxy - 11 - hydroxy - cholestene, $\Delta^8$ - 3 - acyloxy - 7 - methoxy - 11 - hydroxy - cholestene, $\Delta^8$ - 3 - acyloxy - 7 - ethoxy - 11 - hydroxy - cholestene, $\Delta^8$ - 3 - acyloxy - 7 - cyclohexyloxy - 11 - hydroxy - cholestene, $\Delta^8$ - 3 - acyloxy - 7 - benzyloxy - 11 - hydroxy - cholestene, $\Delta^8$ - 3 - acetoxy - 7 - methoxy - 11 - hydroxy - cholestene, $\Delta^8$ - 3 - acetoxy - 7 - ethoxy - 11 - hydroxy - cholestene, $\Delta^8$ - 3 - acetoxy - 7 - cyclohexyloxy - 11 - hydroxy - cholestene, $\Delta^8$ - 3 - acetoxy - 7 - benzyloxy - 11 - hydroxy - cholestene, $\Delta^{8,22}$ - 3 - acyloxy - 7 methoxy - 11 - hydroxy - stigmastadidne, $\Delta^{8,22}$ - 3 - acyloxy - ethoxy - 11 - hydroxy - stigmastadiene, $\Delta^{8,22}$ - 3 - acyloxy - 7 - cyclohexyloxy - 11 - hydroxy - stigmastadiene, $\Delta^{8,22}$ - 3 - acyloxy - 7 - benzyloxy - 11 - hydroxy - stigmastadiene, $\Delta^{8,22}$ - 3 - acetoxy - 7 - methoxy - 11 - hydroxy - stigmastadiene, $\Delta^{8,22}$ - 3 - acetoxy - 7 - ethoxy - 11 - hydroxy - stigmastadiene, $\Delta^{8,22}$ - 3 - acetoxy - 7 - cyclohexyloxy - 11 - hydroxy - stigmastadiene, $\Delta^{8,22}$ - 3 - acetoxy - 7 - benzyloxy - 11 - hydroxy - stigmastadiene, $\Delta^8$ - 3 - acyloxy - 7 - methoxy - 11 - hydroxy - bisnorallocholenic acid, $\Delta^8$ - 3 - acyloxy - 7 - ethoxy - 11 - hy - droxy - bisnorallocholenic acid, $\Delta^8$ - 3 - acyloxy - 7 - cy - clohexyloxy - 11 - hydroxy - bisnorallocholenic acid, $\Delta^8$ - 3-acyloxy-7-benzyloxy-11-hydroxybisnorallocholenic acid, $\Delta^8$ - 3 - acetoxy - 7 - methoxy - 11 - hydroxy - bisnorallo - cholenic acid, $\Delta^8$ - 3 - acetoxy - 7 - ethoxy - 11 - hydroxy - bisnorallocholenic acid, $\Delta^8$ - 3 - acetoxy - 7 - cyclohexyl - oxy - 11 - hydroxy - bisnorallocholenic acid, $\Delta^8$ - 3 - acetoxy - 7 - benzyloxy - 11 - hydroxy - bisnorallocholenic acid, $\Delta^8$ - 3 - acyloxy - 7 - methoxy - 11 - hydroxy - 20 - keto - allopregnene, $\Delta^8$ - 3 - acyloxy - 7 - ethoxy - 11 - hydroxy - 20 - keto - allopregnene, $\Delta^8$ - 3 -acyloxy - 7 - cyclohexyloxy - 11 - hydroxy - 20 - keto - allopregnene, $\Delta^8$ - 3 - acyloxy - 7 - benzyloxy - 11 - hydroxy - 20 - keto - allopregnene, $\Delta^8$ - 3 - acetoxy - 7 - methoxy - 11 - hydroxy - 20 - keto - allopregnene, $\Delta^8$ - 3 - acetoxy - 7 - ethoxy - 11 - hydroxy - 20 - keto - allopregnene, $\Delta^8$ - 3 - acetoxy - 7 - cyclohexyloxy - 11 - hydroxy - 20 - keto - allopregnene, $\Delta^8$ - 3 - acetoxy - 7 - benzyloxy - 11 - hydroxy - 20 - keto - allopregnene, $\Delta^8$ - 7 - methoxy - 11 - hydroxy - dehydrotigogenin acylate, $\Delta^8$ - 7 - ethoxy - 11 - hydroxy - dehydrotigogenin - acylate, $\Delta^8$ - 7 - cyclohexyl - oxy - 11 - hydroxy - dehydrotigogenin acylate, $\Delta^8$ - 7 - benzyloxy - 11 - hydroxy - dehydrotigogenin acylate, $\Delta^8$ - methoxy - 11 - hydroxy - dehydrotigogenin - acetate, $\Delta^8$ - 7 - cyclohexyloxy - 11 - hydroxy - dehydrotigogenin acetate, $\Delta^8$ - 7 - benzyloxy - 11 - hydroxy - dehydro - tigogenin acetate, and the like.

These compounds may be reacted with an acylating agent, as for example, a lower alkanoic acid anhydride such as acetic propionic or butyric anhydride to form the corresponding $\Delta^8$ - 7 - carbinoxy - 11 - acyloxy - allo - cyclopentanopolyhydrophenanthrene compound.

The $\Delta^{8}$-7-carbinoxy-11-hydroxy cyclopentanopolyhydrophenanthrene compounds, for example, $\Delta^{8,22}$-3-acetoxy-7-methoxy-11-hydroxy-ergostadiene, or $\Delta^8$-7-methoxy-11-hydroxy-dehydrotigogenin 3-acetate is reacted with chromium trioxide-acetic acid thereby forming the corresponding $\Delta^8$-7-carbinoxy-11-keto-cyclopentanopolyhydrophenanthrene compound (e.g., $\Delta^{8,22}$-3-acetoxy-7-methoxy-11-keto-ergostadiene or $\Delta^8$-7-methoxy-11-keto-dehydrotigogenin 3-acetate); the latter compound is dissolved in acetic acid and the resulting solution reacted with hydrogen in the presence of platinum catalyst, thereby cleaving the allylic ether linkage and saturating the $\Delta^8$-double bond to produce the corresponding 11-keto-cyclopentanopolyhydrophenanthrene compound (e.g., $\Delta^{22}$-3-acetoxy-11-keto-ergostene or 11-keto-dehydrotigogenin 3-acetate). These 11-keto steroids are converted to adrenal hormones such as cortisone acetate in accordance with the procedures set forth in J.A.C.S. 73, 2396 (1951); J.A.C.S. 73, 4052 (1951); and Nature 168, 28 (1951).

The following examples illustrate methods of carrying out the present invention, but it is to be understood that these examples are given for purposes of illustration and not of limitation.

*Example 1*

A solution of 20 g. of ergosterol-D epoxide in 2 liters of methanol and 2 cc. of formic acid was heated at reflux temperature for two hours in a nitrogen atmosphere. The solution was then concentrated to dryness in vacuo, and the residue dissolved in 200 cc. of ether. The ethereal solution was washed with water, dried over sodium sulfate, and concentrated in vacuo to dryness. The crude diol monoether thus obtained was chromatographed on acid-washed alumina, and the product obtained from the acetone-ether eluate recrystallized from acetone. The purified $\Delta^{8,22}$-3,11-dihydroxy-7-methoxy-ergostadiene thus obtained melted at 154–155° C., $[\alpha]_D^{23}=+90°$ (CHCl$_3$).

*Analysis.*—Calc'd for $C_{29}H_{48}O_3$: C, 78.30; H, 10.88. Found: C, 78.66; H, 11.11.

*Example 2*

A solution of 1.29 g. of $\Delta^{8,22}$-3,11-dihydroxy-7-methoxy-ergostadiene in 3 cc. of pyridine and 3 cc. of acetic anhydride was allowed to stand at room temperature overnight. Three hundred cubic centimeters of ice water was then added with stirring to the solution. The formed solid was filtered, washed free of acid with water, and dried in vacuo. On recrystallization from methanol there was obtained $\Delta^{8,22}$-3,11-diacetoxy-7-methoxy-ergostadiene, M.P. 134.5–135.5° C. Analysis.—Calc'd. for $C_{33}H_{52}O_5$: C, 74.96; H, 9.91. Found: C, 75.17; H, 9.56.

Example 3

A solution of 3 g. of ergosterol-D acetate epoxide in 300 cc. of methanol containing 0.3 cc. of formic acid was heated, under nitrogen, at reflux temperature for two hours. The reaction mixture was then concentrated to a volume of about 50 cc., and 300 cc. of ice water added. The crude solid was filtered, washed free of acid and dried. The crude product so obtained was chromatographed on acid-washed alumina. The residue from the acetone-ether eluate was recrystallized from methanol to yield $\Delta^{8,22}$-3-acetoxy-7-methoxy-11-hydroxy-ergostadiene, M.P. 159–160° C., $[\alpha]_D^{23} = +57°$ ($CHCl_3$).

Various changes and modifications may be made in carrying out the present invention without departing from the spirit and scope thereof. Insofar as these changes and modifications are within the purview of the annexed claims, they are to be considered as part of my invention.

I claim:

1. A $\Delta^8$-allosteroid having the following formula:

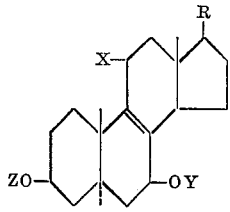

wherein Y is a lower hydrocarbon radical, Z is a radical selected from the group consisting of hydrogen and lower hydrocarbon carbonyl radicals, X is a radical selected from the group consisting of hydroxy and keto radicals, and R is an organic side chain selected from the group which consists of ergosterol side chain, cholesterol side chain, stigmasterol side chain, cholanic acid side chain, bisnorcholanic acid side chain, pregnane side chain, and tigogenin side chain.

2. $\Delta^{8,22}$-7-lower alkoxy-3,11-dihydroxy-ergostadiene.
3. $\Delta^{8,22}$-7-lower alkoxy - 3,11 - bis(lower alkanoyloxy)-ergostadiene.
4. $\Delta^{8,22}$-3,11-dihydroxy-7-methoxy-ergostadiene.
5. $\Delta^{8,22}$-3-acetoxy-7-methoxy-11-hydroxy-ergostadiene.
6. $\Delta^{8,22}$-3,11-diacetoxy-7-methoxy-ergostadiene.
7. $\Delta^8$-7-lower alkoxy-3,11-dihydroxy dehydrotigogenin.
8. $\Delta^8$-7-lower alkoxy-3,11-bis(lower alkanoyloxy) dehydrotigogenin.
9. $\Delta^8$-3-acetoxy - 7 - methoxy-11-hydroxy dehydrotigogenin.
10. $\Delta^8$-3,11-diacetoxy-7-methoxy-dehydrotigogenin.
11. The process which comprises reacting a carbinol, in the presence of an organic acid catalyst, with a $\Delta^7$-allosteroid having the following formula:

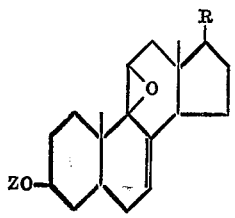

wherein Z is a radical selected from the group which consists of hydrogen and lower hydrocarbon carbonyl radicals, and R is an organic side chain selected from the group which consists of ergosterol side chain, cholesterol side chain, stigmasterol side chain, cholanic acid side chain, bisnorcholanic acid side chain, pregnane side chain, and tigogenin side chain; thereby producing a $\Delta^8$-allosteroid of the formula:

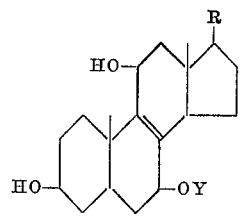

wherein Y is a lower hydrocarbon radical, and R has the significance above-defined.

12. The process which comprises reacting $\Delta^{7,22}$ - 3 - (lower alkanoyloxy) 9,11-epoxy-ergostadiene with an alkanol in the presence of an organic acid catalyst thereby producing $\Delta^{8,22}$-3-(lower alkanoyloxy) 7-lower alkoxy-11-hydroxy-ergostadiene compound.

13. The process which comprises reacting ergosterol-D acetate epoxide with methanol in the presence of formic acid catalyst to produce $\Delta^{8,22}$-3-acetoxy-7-methoxy-11-hydroxy-ergostadiene.

14. The process which comprises reacting ergosterol-D epoxide with a lower alkanol in the presence of from about .1% to about .3% by volume of formic acid under substantially anhydrous conditions to produce the corresponding $\Delta^{8,22}$-3,11-dihydroxy-7-lower alkoxy ergostadiene.

15. The process which comprises treating a methanolic solution of ergosterol-D epoxide with from about .1% to about .3% by volume of formic acid under substantially anhydrous conditions, separating the $\Delta^{8,22}$-3,11-dihydroxy-7-methoxy-ergostadiene which is formed, and subjecting it to acylation to form $\Delta^{8,22}$-3,11-diacetoxy-7-methoxy-ergostadiene.

16. The process which comprises reacting $\Delta^7$-3-(lower alkanoyloxy)-9,11-epoxy-dehydrotigogenin with an alkanol in the presence of an organic acid catalyst thereby producing $\Delta^{8,22}$-3-(lower alkanoyloxy) 7-lower alkoxy-11-hydroxy-dehydrotigogenin compound.

17. The process which comprises reacting ergosterol-D epoxide with methanol in the presence of from about .1% to about .3% by volume of formic acid under substantially anhydrous conditions to produce $\Delta^{8,22}$-3,11-dihydroxy-7-methoxy-ergostadiene.

References Cited in the file of this patent

UNITED STATES PATENTS

| | | |
|---|---|---|
| 2,768,186 | Ruzicka et al. | Oct. 23, 1956 |
| 2,768,188 | Ruzicka et al. | Oct. 23, 1956 |

OTHER REFERENCES

Fieser & Fieser, Natural Compounds Related to Phenanthrene, page 425, 3rd edition, 1949.